Patented June 13, 1933

1,913,405

UNITED STATES PATENT OFFICE

VIRGIL E. MEHARG, OF BLOOMFIELD, NEW JERSEY, AND HOMER ADKINS, OF MADISON, WISCONSIN, ASSIGNORS TO BAKELITE CORPORATION, OF NEW YORK, N. Y., A CORPORATION OF DELAWARE

FORMALDEHYDE SYNTHESIS AND CATALYST

No Drawing.    Application filed July 31, 1931.   Serial No. 554,378.

This invention relates to the production of formaldehyde by the catalytic oxidation of methanol, and to the catalyst which is used.

Various catalysts such as copper and silver gauze have been suggested for use in this reaction but they are not desirable because of the relatively large amount of by-products which they produce. Other catalysts have been suggested but they are usually of a type which have very little inherent strength and therefore must be mounted on a support. Such catalysts have a relatively short life because of their fragility.

The catalyst which forms the subject of the present invention is highly satisfactory from a practical standpoint in that it combines long life with a high yield of formaldehyde, the yield being based both on the weight of formaldehyde produced per hour and the weight of formaldehyde produced from an equivalent molecular weight of methanol. The catalyst has relatively great inherent strength so that it may be used by itself in the catalytic chamber, that is, it does not have to be supported. Because of its strength, it does not erode so quickly as do similar catalysts and even though there be a slight amount of erosion, such a large amount of catalyst can be packed in a given space, that the catalyst lasts for an exceedingly long time before the catalytic chamber has to be opened to renew the supply of catalyst. The catalyst also operates at a relatively low temperature with many advantages, namely that the catalyst is not so likely to be "killed" by high heating, cheaper materials may be used in the construction of the apparatus because they do not have to withstand such high temperatures, and there is less tendency for the formaldehyde to decompose after it leaves the catalytic chamber. In addition to these advantages, the catalyst reacts all of the methanol converting substantially all of it into formaldehyde, with a very small percentage of by-products, thus eliminating all of the recovery processes which heretofore have of necessity been used to recover the unreacted methanol.

These and other objects and features of the invention will more fully appear from the following claims taken in conjunction with the accompanying specification which, however, must be taken as merely illustrating the invention and in no way limiting it to the specific embodiment about to be described.

The catalyst is a mixture of molybdenum oxide and one or more of the oxides of iron, lanthanum, thorium, neodynium, zinc, and tin, the mixture of molybdenum oxide and ferric oxide being the preferred catalyst. The invention will therefore be described in connection with a catalyst containing only iron and molybdenum oxides.

In making the catalyst, a dilute water solution of a molybdenum salt, such as ammonium molybdate (hepta-molybdate) and an iron salt such as ferric chloride, are prepared. The two solutions are mixed and a dense yellow precipitate of the oxides of molybdenum and iron is obtained therefrom which is thoroughly washed. The precipitate is then filtered on a vacuum filter using a high vacuum, and a relatively high pressure is put on the precipitate to compact it as it is being filtered. The resulting product is a fairly dense but somewhat porous mass which still contains a considerable amount of moisture. It is thereafter thoroughly dried, so much of the water being taken off as will evaporate in an oven maintained at substantially 100° C. in from 1 to 3 days.

The catalyst is a mixture of the oxides of iron and molybdenum, the molybdenum oxide being the specific catalyst and the iron oxide being the promoter. For commercial use under the conditions later to be set forth, the catalyst preferably contains molybdenum equivalent to from substantially 60% to substantially 99% by weight of molybdenum trioxide. If much more than 20% by weight of iron oxide is used, the catalyst has a tendency to form by-products and waste the methanol. If less than 5% of the iron oxide is used, the catalyst does not operate so quickly as is deemed desirable. From 8% to 20% by weight of iron oxide ($Fe_2O_3$) is deemed the optimum composition.

The catalyst appears to be a precipitate caused by the addition of a positive and a negative colloid. Its character as revealed by X-ray study, shows that it lies on the border-line between a crystalline and an amorphous compound because the X-ray plates show the darkening effect characteristic of an amorphous material while there are also definite lines which indicate a crystalline structure.

The dried catalyst is a hard but highly porous light yellow homogeneous mass having sufficient inherent strength to support itself in the catalyst chamber independently of extraneous internal support. The solid mass prepared as above described, and consisting throughout of a homogeneous mass, is broken up and preferably screened through a 5 to 10 mesh screen which gives pieces of effective size to be used in a catalytic tube. For practical use the catalytic tube is provided at one end with a screen through which the pieces of catalyst will not pass, then the catalyst is placed in the tube to a depth of from 6 to 12 inches after which a pre-heater, of a heat conducting metal, such as steel balls, is placed on top of the catalyst. The larger the pieces of catalyst the greater the quantity of catalyst placed in the tube because there is less effective catalyst surface; also the greater the effective area of catalyst, the faster the vapors can be passed through the catalytic chamber, but the additional heat due to the increased rate of reaction must be dissipated. The larger pieces of catalyst are preferred to the smaller pieces because they do not pack together so closely and the vapors can pass through the tube more easily, and also because, as the catalyst erodes, the fine dust has a greater tendency to pass out of the catalytic chamber rather than remain in the chamber to choke it and to prevent the passage of vapors. It should be understood, however, that in any case the surface area of the catalyst should be sufficient to react all of the methanol.

With this catalyst, the conditions of working the process may vary within rather wide limits, and this is a great advantage in practical operation because the process is thereby rendered very flexible. The reaction takes place in the vapor phase, and the vapors usually enter the preheating portion of the heater at substantially room temperature. Air is most frequently used to supply the oxygen necessary for the reaction. The methanol is vaporized in any suitable manner. The vapors entering the pre-heater contain substantially from 8% to 10% by weight of methanol but, as previously stated, this is subject to wide variation. This percentage of methanol is preferably used with a catalytic chamber consisting of several parallel pipes because it has been found relatively easy to extract the heat generated by the mixture of air and methanol containing this percentage of methanol vapor. With a less efficiently cooled chamber, the percentage of methanol should be decreased, and with a more efficiently cooled chamber the methanol may be increased. If the reactants are mixed in the above stated proportions and are then passed through the catalytic tubes so that the vapors are in contact with the catalyst for approximately .01 to .03 of one second and the temperature of the chamber is maintained at approximately 250° C., all of the methanol can be reacted with only one passage through the catalyst, even though the temperature is relatively low, and an efficiency of substantially 95% may be obtained if desired, that is substantially 95% of the methanol which is fed into the catalytic chamber is obtained as formaldehyde in the finished product. This is not only a higher efficiency than has previously been obtained but is a complete conversion of the methanol which is usually desirable because it eliminated the necessity of recovering unreacted methanol from the product. If it is desired that the finished product contain methanol in addition to formaldehyde, it is possible to accomplish this with less than a 5% loss of methanol, by changing the conditions under which the reaction is carried out, for instance by lowering the temperature of the reaction chamber or by increasing the rate of flow of the vapors.

It should be distinctly understood, however, that although certain operative conditions have been stated, the temperature, time of contact, and composition of the reacting mixture may be varied within rather wide limits, and that the above description is given only by way of example. For instance, the bath temperature may vary from 25° to 50° C. or more on either side of the normal operating temperature of 250° C. Furthermore, the percentage of methanol in the entering vapor may vary anywhere from 5% to 12% and the time of contact of the vapors with the catalyst may vary from .005 seconds to 0.5 seconds without appreciably affecting the yield. As previously stated, however, a good combination of operating conditions is; bath maintained at 250° C., reactants consist of from 8% to 10% by weight of methanol vapor with 90% to 92% air, reactants in contact with catalyst for substantially .01 to substantially .03 of one second, catalyst substantially 8 mesh indiscriminately packed in tubular catalytic chambers to a depth of substantially 9 inches. Under these conditions, substantially 95% of the methanol is converted into formaldehyde, and substantially 5% of by-products, consisting of $CO$ and $CO_2$, and a trace (.001–.01%) of organic acid, are formed. The by-products do not contaminate or foul the catalyst which will operate satisfactorily for from 6 to 18 months without renewal as substantially the only condition which will render the process ineffective is the gradual erosion of the catalyst with the consequent clogging of the tubes of the catalyst chamber. It takes a relatively long time for the tubes to clog, however, because the relatively large pieces of the catalyst and the relatively large spaces between them enable the dust formed by the erosion of the catalyst to pass out of the chamber, and as there is such a great quantity of the catalyst in the permissible chamber space compared to the quantity of active catalyst which could be put into the same space if it had to be mounted on a support, the operation can be continued for an exceedingly long time without stopping to renew the catalyst. Since all the methanol can be and usually is reacted, there is no costly or troublesome recovery of methanol, and the process is very inexpensive to operate. All previous commercial catalysts have produced a relatively large amount of acid even with an incomplete conversion of the methanol to formaldehyde. In many cases this acid runs as high as 1% and is highly objectionable. With the herein described catalyst operated in the proper manner, the acid almost never runs above .01% and is consistently below that figure, quite frequently being as low as .001%.

During the process the catalyst, so far as the eye can see, changes only slightly in color. At the start of the reaction it is a light yellow and on continued operation it becomes more white. X-ray examination of the used catalyst discloses a slight crystalline growth but neither change seems to affect the catalyst which is extremely rugged.

From the foregoing explanation of the invention, it will be understood that many changes may be made in operating conditions. The exact conditions of commercial operation are most likely to be determined by the materials available for the manufacture of the apparatus and the materials which cool the catalytic chamber, or the design of the chamber for the extraction of heat. In general, it may be remarked that the faster the reactance and passed over the catalyst, the greater is the amount of formaldehyde formed per hour up to a point where the vapors do not remain in contact with the catalyst long enough for the complete conversion of the methanol. The higher the temperature, the more complete will be the conversion of the methanol but the greater will be the loss in by-products. The longer the time that the reactants are in contact with the catalyst, the more complete will be the conversion of the methanol and, therefore, as the catalyst erodes, the speed of the gases should be slightly decreased or else the temperature of the catalytic chamber should be slightly increased. The greater the percentage of methanol in the reactants, the greater will be the production of formaldehyde per hour for the same time of contact until the point is reached where the proportion of methanol to oxygen is so large that the conditions in the catalytic chamber are not strongly oxidizing or the heat developed cannot be dissipated, it being understood that if a larger percentage of methanol is used, there is a proportionately larger amount of heat generated and, as this must be removed, a greater cooling will have to be effected else the catalyst will become too hot and will burn out. The greater the percentage of iron oxide in the catalyst, the more quickly will the methanol be converted into formaldehyde and by-product, but also, the greater will be the quantity of the by-product. The greater the percentage of molybdenum oxide the slower will be the conversion and the less will be the quantity of by-product formed. It is therefore to be understood that it is recognized that many modificatioins of the catalyst and process may be made and it is desired that the invention is to be construed as broadly as the claims taken in conjunction with the prior art, may allow.

We claim:

1. A catalyst for the oxidation of methanol to formaldehyde, containing iron and molybdenum, the iron and molybdenum being in the same proportions as would be present in an iron oxide, molybdenum trioxide mixture containing from substantially 40% to 66% of molybdenum by weight.

2. A catalyst for the oxidation of methanol to formaldehyde including a porous mass of precipitated iron and molybdenum compounds, the iron and molybdenum being in the same proportions as would be present in an iron oxide, molybdenum trioxide mixture containing from substantially 40% to 66% of molybdenum by weight.

3. A catalyst for the oxidation of methanol to formaldehyde, containing iron oxide and molybdenum oxide and having sufficient inherent strength to maintain its form.

4. A catalyst for the oxidation of methanol to formaldehyde consisting of a homogeneous catalytic mass containing molybdenum oxide and iron oxide.

5. A catalytic unit for the oxidation of methanol to formaldehyde consisting of a homogeneous mass containing the catalysts molybdenum oxide and iron oxide, the latter constituting not more than 20 per cent of the mass.

6. A catalyst for the oxidation of methanol to formaldehyde consisting throughout of a homogeneous mass containing the catalysts molybdenum oxide and iron oxide.

7. A catalyst for the oxidation of methanol to formaldehyde consisting of individual units of a homogeneous catalytic mass containing molybdenum oxide and iron oxide.

8. A catalyst for the oxidation of methanol to formaldehyde consisting of a homogeneous mass containing the catalysts molybdenum oxide and iron oxide and independent of extraneous internal support.

9. A process of producing formaldehyde which includes the step of passing a gaseous mixture containing methanol and oxygen in contact with a heated catalyst containing molybdenum oxide and iron oxide and having sufficient inherent strength to maintain its form.

10. A process of producing formaldehyde which includes the step of passing a gaseous mixture containing methanol and oxygen in contact with a heated catalyst consisting throughout of a homogeneous mass containing molybdenum oxide and iron oxide.

11. A process of producing formaldehyde which includes the step of passing a gaseous mixture containing methanol and oxygen in contact with a heated catalyst consisting throughout of a homogeneous mass containing molybdenum oxide and an oxide of at least one of the group consists of, iron, lanthanum, thorium, neodynium, zinc, and tin.

12. Process of producing formaldehyde which comprises passing a gaseous mixture of methyl alcohol and oxygen in contact with a catalyst consisting essentially of an oxide of molybdenum and an oxide of iron, the latter constituting not more than twenty per cent of the catalyst.

13. Process of producing formaldehyde which comprises passing a gaseous mixture containing methyl alcohol and oxygen in contact with a catalyst consisting essentially of an oxide of molybdenum and an oxide of iron at a temperature maintained at approximately 250° C.

14. Process of producing formaldehyde which comprises passing a gaseous mixture containing methyl alcohol and oxygen in contact with a catalyst composed of oxides obtained as a precipitate from solution of a molybdenum and a salt of one of the metals of the group consisting of iron, lanthanum, thorium, neodynium, zinc and tin.

In testimony whereof, we affix our signatures.

VIRGIL E. MEHARG.
HOMER ADKINS.